US012810260B2

(12) United States Patent
Kaufman et al.

(10) Patent No.: US 12,810,260 B2
(45) **Date of Patent: *Nov. 24, 2026**

(54) INTELLIGENT PAYMENT ROUTING AND PAYMENT GENERATION

(71) Applicant: CONNEXPAY LLC, Lake Elmo, MN (US)

(72) Inventors: Robert James Kaufman, Lake Elmo, MN (US); Jacob Benjamin Eisen, Lake Elmo, MN (US); Robin Jean Butler, Lake Elmo, MN (US); Timothy Michael Arthur Chalk, Lake Elmo, MN (US)

(73) Assignee: CONNEXPAY LLC, Lake Elmo, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/883,484

(22) Filed: Sep. 12, 2024

(65) Prior Publication Data

US 2025/0005540 A1 Jan. 2, 2025

Related U.S. Application Data

(63) Continuation of application No. 16/761,882, filed as application No. PCT/US2018/059399 on Nov. 6, 2018, now Pat. No. 12,118,519.

(Continued)

(51) Int. Cl.

*G06Q 30/0226* (2023.01)
*G06Q 20/02* (2012.01)

(Continued)

(52) U.S. Cl.

CPC ......... *G06Q 20/027* (2013.01); *G06Q 20/227* (2013.01); *G06Q 20/3829* (2013.01);

(Continued)

(58) Field of Classification Search

CPC ............ G06Q 30/0226; G06Q 20/027; G06Q 20/227; G06Q 20/3829; G06Q 20/4016; G06Q 20/405

See application file for complete search history.

(56) References Cited

U.S. PATENT DOCUMENTS

| | | | | |
|---|---|---|---|---|
| 6,675,153 B1 | | 1/2004 | Cook et al. | |
| 9,619,792 B1 | * | 4/2017 | Aaron | G06Q 30/0226 |

(Continued)

FOREIGN PATENT DOCUMENTS

| | | |
|---|---|---|
| WO | 2017/031181 | 2/2017 |

OTHER PUBLICATIONS

Extended European Search Report, European Application No. 18871956.1, mailing date Jun. 15, 2021, 9 pgs.

(Continued)

*Primary Examiner* — Azam A Ansari

(74) *Attorney, Agent, or Firm* — Husch Blackwell LLP

(57) ABSTRACT

Systems and methods for receiving customer payment details and generating outgoing payment details on-demand. A network-connected interface can receive customer payment details for payment of an incoming amount. A data store can store a plurality of transaction tracking records including a unique key code and an allocatable amount. A payment gateway can receive authorization data for payment of the incoming amount. An outgoing payment generator can respond to an outgoing payment request comprising an offered key code and an outgoing payment amount if the offered key code matches an existing transaction tracking record in the data store. Outgoing payment details can be generated if the outgoing amount is less than or equal to the allocatable amount. Embodiments can route the transaction such that the customer payment details are passed through to (Continued)

the supplier. Embodiments can make routing and generation decisions based on transaction preferences.

2 Claims, 15 Drawing Sheets

Related U.S. Application Data

(60) Provisional application No. 62/582,302, filed on Nov. 6, 2017.

(51) Int. Cl.
*G06Q 20/22* (2012.01)
*G06Q 20/38* (2012.01)
*G06Q 20/40* (2012.01)

(52) U.S. Cl.
CPC ....... *G06Q 20/4016* (2013.01); *G06Q 20/405* (2013.01); *G06Q 30/0226* (2013.01)

(56) References Cited

U.S. PATENT DOCUMENTS 10,089,619 B1 * 10/2018 Koeppel .............. G06Q 20/363
2002/0152123 A1 10/2002 Giordano et al.
2008/0120240 A1 * 5/2008 Ginter ..................... H04L 63/16
705/51
2009/0157518 A1 * 6/2009 Bishop ................... G06Q 20/20
705/19
2009/0319473 A1 12/2009 Rao et al.
2011/0173122 A1 * 7/2011 Singhal .................. G06Q 20/42
705/44
2012/0271765 A1 10/2012 Cervenka et al.
2012/0303425 A1 * 11/2012 Katzin ............... G06Q 20/4016
705/16
2014/0258556 A1 9/2014 Ratica
2015/0012425 A1 1/2015 Mathew
2015/0032625 A1 1/2015 Dill et al.
2015/0206143 A1 7/2015 Kurian
2015/0228018 A1 * 8/2015 Richman ............ G06Q 30/0226
705/38
2017/0032338 A1 * 2/2017 Szollar ................. G06Q 20/102
2018/0089598 A1 3/2018 Sedlarevic et al.
2021/0216976 A1 7/2021 Kaufman et al.

OTHER PUBLICATIONS

International Preliminary Report on Patentability, International Application No. PCT/US2018/059399, mailing date: Dec. 11, 2019, 24 pgs.
International Search Report and Written Opinion, International Application No. PCT/US2018/059399, mailing date: Jan. 22, 2019, 14 pgs.
Application and File History for U.S. Appl. No. 16/761,882, filed May 6, 2020, inventors Kaufman et al., as available in Patent Center at www.uspto.gov, 671 pgs.

* cited by examiner

Prior Art

(Payment Processing as Merchant of Record)

(Payment Pass-through)

Payment Details

| **Cards** | **ACH** | **Cryptocurrency** | **P2P Transfers** |
|---|---|---|---|
| Name on Card | Name | Wallet ID/Public Key | Username |
| Account Number | Routing Number | Currency Type | Authorization token |
| Billing Zip Code | Account Number | | |
| Card Verification Value/Code (CVV/CVC) | | | |
| Expiration Date | | | |

INTELLIGENT PAYMENT ROUTING AND PAYMENT GENERATION

CROSS-REFERENCE TO RELATED APPLICATIONS

The present application is a Continuation of U.S. patent application Ser. No. 16/761,882, filed May 6, 2020, which is a National Phase entry of PCT Application No. PCT/US2018/059399, filed Nov. 6, 2018, which claims priority from U.S. Provisional Patent Application No. 62/582,302 filed Nov. 6, 2017, each of which is fully incorporated herein by reference.

TECHNICAL FIELD

Embodiments of the present disclosure relate generally to the field of electronic payment processing, and particularly to the generation of payment details on-demand.

BACKGROUND

Brokers or other intermediaries often function by receiving a request for a product or service from a customer and purchasing the product or service from a supplier on the customer's behalf. These transactions are often facilitated through the use of various electronic payment methods such as credit/debit cards, automatic clearing house "ACH" transfers, bank wire transfers, cryptocurrency transfers, and the like. Two methods of managing brokered transactions are depicted in FIGS. 1A and 1B.

As depicted in FIG. 1A, a broker 10 can act as a merchant of record and be responsible for processing the received customer payment details 20 by communicating with a payment processor 22 to receive an authorization 24. Payment processor 22 is often a service provider that provides an interface between the account of broker 10 and the financial institution(s) associated with customer payment details 20. The broker can then provide broker payment details 12 to supplier 30 to purchase the good or service. The broker-to-supplier payment may be backed by a source of funds such as the broker's bank or line of credit 14. Generally, each of the customer-to-broker payment and the broker-to-supplier payment is a separate transaction and each is processed by separate existing systems.

FIG. 1B presents an alternate scenario where the broker passes the customer payment details 20 through to the supplier, who then requests the authorization rather than the broker processing the payment. This method is often disfavored by the broker, especially where the broker is making purchases from a number of different suppliers, resulting in a number of varied transactions (from different vendors) on the customer's bank statement.

Pain points exist for brokers principally because financial institutions (such as banks) view brokers as "high risk" companies when acting as merchant of record. High risk merchants include brokers such as, for example, some travel agencies, & tour operators, non-travel related event ticket vendors, or other e-commerce facilitators. Some of these businesses have been classified by card brand networks to be in the same category of risk as online gambling and online pornography merchants. This high-risk categorization is primarily because of what banks deem "future delivery risk" associated with their business.

If a travel agency, for example, accepts payment from a traveler for a vacation taking place nine months from today, the bank providing the merchant account processing for that payment is at risk from the time the booking happens until the travel takes place. If the travel company fails during that time, "chargebacks" on the transaction may result (for example, if the travel company did not pay for a reserved hotel room). The bank that provided the funds for the travel agency may end up on the hook for the amount of the chargebacks. These situations, even non-fraudulent ones, have costs banks tens of millions of dollars.

In order for brokers to act as merchants of record and process cards from customers, these types of companies often face less desirable terms of business. These can include: higher fees for accepting cards than almost any other business, requirements for personal guarantees from the business owners, limits on how much the company can process each day or month (resulting in a need for multiple accounts), and requirements for cash reserves to be held at the bank and/or hold backs on the company's daily deposits.

Many brokers are also often not in a position to act as merchants of record, because of the unavailability of suitable sources of funds (for example, due to lack of credit access to fund broker-to-supplier payments). Even where reasonable terms are available, brokers can face cash flow and credit challenges due to the timing of settlement of their incoming customer payments and when they need to provide and fund outgoing payments. For example, when a travel agency sells an airline ticket, it processes the travelers debit or credit card with its merchant account, but it will not see those available funds in its checking account for at least 24 hours; often two or three days later. However, a travel agency cannot "hold" the airline ticket and instead must generally pay for it at the time of booking. For a mid-size agency processing $1 million per day in travel, this multi-day delay may result in a need for $4-$6 million of credit (especially when purchases are made over the weekends during busy seasons). For a mid-size travel agency with no significant assets as collateral, it is often effectively impossible to get a business line of credit of that size without a personal loan to the business or personal guarantee from the business owner.

When the transactions are complete, the reconciliation process for broker companies can also be burdensome as they must keep track of both incoming payments from customers and outgoing payments to the end providers. Often, brokers may have entire teams that focus solely on transaction reconciliation.

The reconciliation issue can be mitigated somewhat through the use of existing virtual payment mechanisms. These mechanisms allow payers to generate virtual payment details on-demand. These so-called "virtual cards" offer a number of benefits because they enable payers to create cards with specified attributes such as the number of uses, authorized payees, transaction amounts, and the like. Each virtual card, however, must be underwritten or backed by a source of funds, and therefore cannot alleviate credit and cash flow challenges faced by broker companies.

Brokers also face additional cash flow challenges related to the fees and rebates associated with their payments. Each payment processor may require the broker to pay a fee in exchange for receiving the settlement of incoming payments (for example, through debit, credit, and charge card interchange fees, or incoming ACH or wire fees). These fees can be fixed or percentage based. Further, the fees can vary based on payment network, specific card types in the payment network (for example, rewards cards), or even attributes of the customer. These fees need to be paid daily or monthly. While many brokers can also earn rebates based on payments made to suppliers on behalf of the customer to offset the cost of incoming payment acceptance, such rebates are almost always paid after the date on which incoming payment fees are due.

SUMMARY

Embodiments of the present disclosure include systems and methods for receiving customer payment details and generating outgoing payment details on-demand.

In an embodiment, a system for providing on-demand outgoing payment details comprises a network-connected interface to receive customer payment details for payment of an incoming amount. A data store can be configured to store a plurality of transaction tracking records, that each include a unique key code and an allocatable amount. A payment gateway can be communicably coupled to a payment processor and configured to request authorization data for payment of the incoming amount from the payment processor, store a transaction tracking record in the data store upon receipt of the authorization data, the allocatable amount of the transaction tracking record being initialized to a value less than or equal to the incoming amount. An outgoing payment generator can be configured to receive at least one outgoing payment request comprising an offered key code and an outgoing amount. For each outgoing payment request having an offered key code matching an existing transaction tracking record in the data store, the outgoing payment generator can generate outgoing payment details and reduce the allocatable amount of the existing transaction tracking record by the outgoing amount if the outgoing amount is less than or equal to the allocatable amount.

In an embodiment, the payment generation engine can be configured to provide the outgoing payment details to a user. In an embodiment, the payment details request further comprises identifying information for a supplier. The payment generation engine can be configured to provide the outgoing payment details to the supplier.

In an embodiment, the customer payment details can be associated with a first payment type and the outgoing payment details can be associated with a second payment type. The data store can be configured to store a plurality of payment type profiles, each payment type profile associating a payment type with one or more payment attributes.

In an embodiment, the outgoing payment request comprises a supplier identifier and a purchase type. The data store can be configured to store a plurality of transaction preferences, each transaction preference defining one or more desired payment attributes based on at least one of: the outgoing amount, the supplier identifier, or the purchase type.

In an embodiment, the outgoing payment generator can be configured to generate the outgoing details by selecting an outgoing payment type based on the outgoing payment request, the plurality of transaction preferences, and the plurality of payment type profiles.

In an embodiment, the one or more payment attributes can be selected from the group consisting of: a payment method, a brand, a loyalty program, an account number group, and an expected fee.

In an embodiment, a transaction router can be configured to bypass the payment processor and the outgoing payment generator and provide the customer payment details for payment of at least a portion of the outgoing amount based on the incoming payment details, the plurality of transaction preferences, the plurality of payment type profiles, and the outgoing transaction information.

In an embodiment, the data store can be configured to update the payment type profile for the payment type associated with the customer payment details based on one or more payment terms received from the payment processor.

In an embodiment, a fraud detection engine is configured to provide a fraud detection result based on the customer payment details, the incoming amount, and/or the purchase type.

In an embodiment, a method for providing on-demand outgoing payment details by a network-connected computing system comprises receiving, at a network-connected interface, customer payment details for payment of an incoming amount, requesting authorization data for payment of the incoming amount from a payment processor, storing a transaction tracking record in a data store upon receipt of the authorization data. The transaction tracking record can comprise a unique key code and an allocatable amount, the allocatable amount being initialized to a value less than or equal to the incoming amount. The method can further include, in response to receiving an outgoing payment request comprising an offered key code and an outgoing amount, verifying that the offered key code matches an existing transaction record in the data store and that the outgoing amount is less than or equal to the allocatable amount of the existing transaction record, and generating outgoing payment details and reducing the allocatable amount of the existing transaction record by the outgoing amount.

In an embodiment, outgoing payment details can be provided to the user (which can be a broker user). In an embodiment, the payment details request further comprises identifying information for a supplier and the outgoing payment details can be provided to the supplier.

In an embodiment, a plurality of transaction preferences can be stored in the data store. Each transaction preference can define one or more desired payment attributes based on at least one of: the outgoing amount, the supplier identifier, or the purchase type.

In an embodiment, a fraud detection result can be provided by a fraud detection engine based on the customer payment details and the incoming amount.

In an embodiment, payment terms received when transactions using the outgoing payment details are settled can be used to update the payment type profile associated with the outgoing payment details.

In an embodiment, a method for providing on-demand outgoing payment details to a broker underwritten by payment details received by a customer of the broker such that the broker can provide the outgoing payment details in real time to a supplier to complete a transaction on behalf of the customer. The method can comprise receiving customer payment details for payment of an incoming amount, performing a fraud check based on the customer payment details, the incoming amount and a category of the transaction, obtaining authorization data from a payment processor, receiving, in a reserve account, funds of the incoming amount, increasing an available credit value for the broker in a data store by an amount equal to the incoming amount, creating a unique key code based on the authorization data, creating outgoing payment details in response to an outgoing payment request including an offered key code that matches the unique key code, and providing settlement by transferring funds of a markup amount from the reserve account to an account specified by the broker.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures.

Figure 1A:
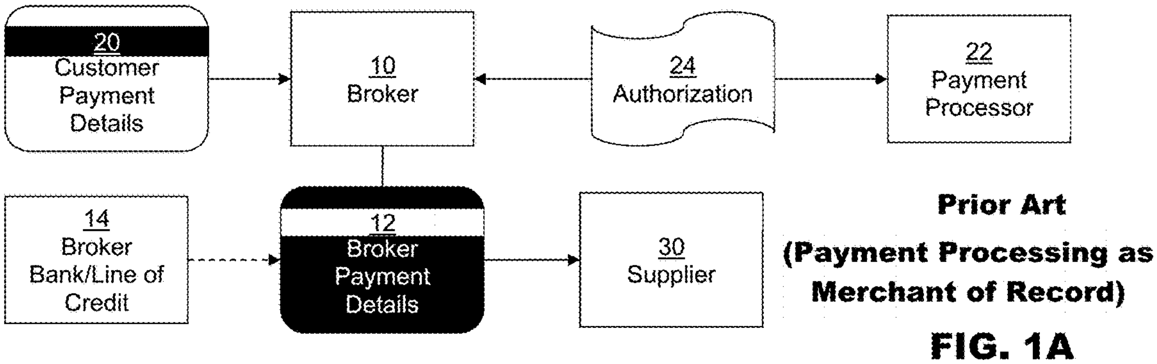
FIG. 1A is a flowchart depicting a conventional payment processing method.
Figure 1B:
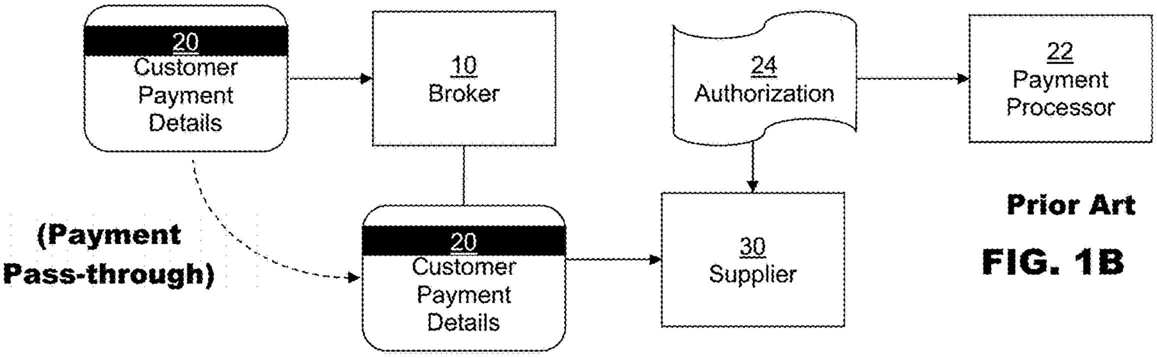
Prior Art FIG. 1B
FIG. 1B is a flowchart depicting a conventional payment processing method.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Figure 2:
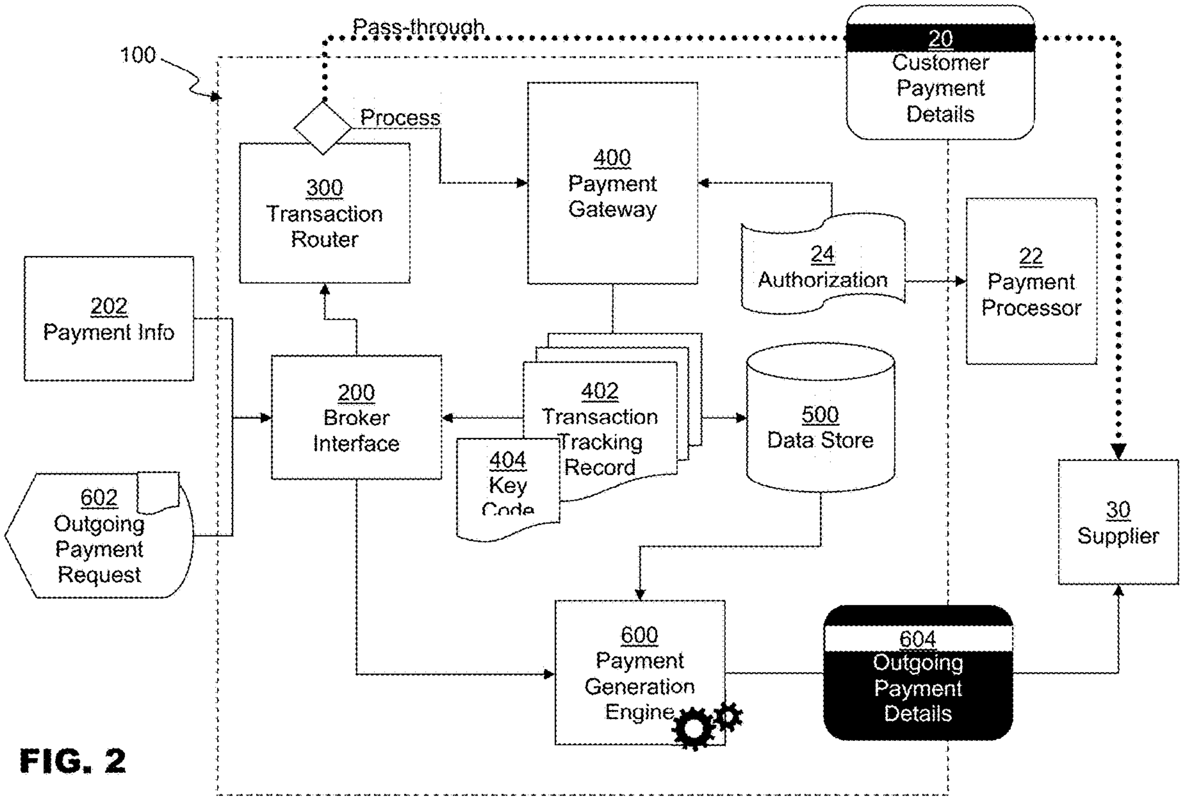
FIG. 2 is a schematic diagram depicting a payment processing system, according to an embodiment.

Embodiments of the present disclosure provide systems and methods for providing on-demand payment details that can be provided to a supplier for the purchase, reservation, or other procurement of goods and/or services on behalf of a customer. As depicted in FIG. 2, system 100 comprises a broker interface 200, an intelligent transaction router 300, a payment gateway 400, a data store 500, and a payment generation engine 600.

Figures 3A, 3B:
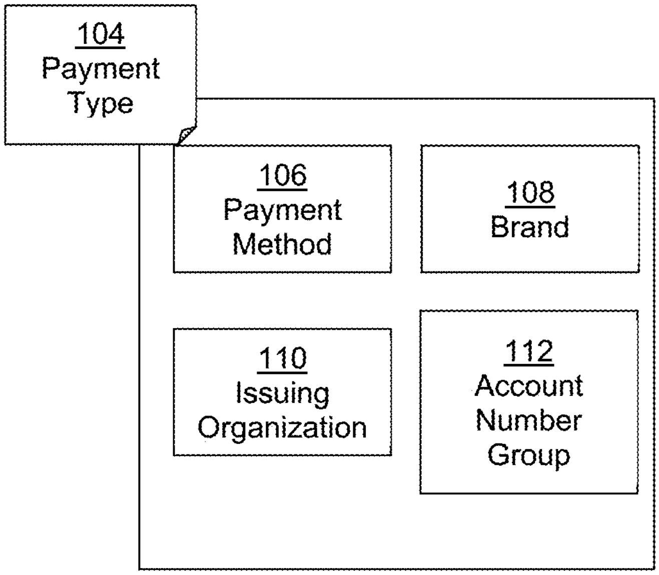
FIG. 3A is a schematic diagram depicting data elements of various payment methods, according to an embodiment.
FIG. 3B is a schematic diagram depicting data elements of payment type, according to an embodiment.

Embodiments of the present disclosure can receive customer payment details 20 and provide, or generate, outgoing payment details 604. Payment details 102 comprise the information necessary to process a payment and can vary based on a payment method (or "category") of the payment details. Embodiments of the present disclosure can support a variety of payment methods including cards (such as credit, debit, or charge cards), ACH transfers, real-time payments (RTPs), crypto-currency transfers, and other forms of electronic funds transfer such as PAYPAL, VENMO, and the like. FIG. 3A is a chart depicting data elements that can be received or generated for each payment method, though other data elements can be supported by embodiments.

Each payment method can include one or more payment types 104. For example, ACH payments can be same-day ACH, or standard ACH types. Similarly, card payments can be grouped by bank identification numbers or, BINs. FIG. 3B is a schematic diagram depicting data elements that can be stored, for example in data store 500, for each payment type 104. Each payment type 104 can comprise a reference to a payment method 106, as discussed above. In embodiments, payment types 104 can comprise a payment brand 108, and an issuing organization 110.

With respect to card payments, a BIN can be identified based on the first six digits of a card number, though other schemes can be used. Each BIN, or account number group 112, can be associated with a specific card brand 108 (such as MASTERCARD, VISA, DISCOVER, AMERICAN EXPRESS, or the like), an issuing organization 110 (such as a bank), one or more loyalty partners (such as a VISA card that provides extra benefits when shopping at a particular grocery store). Therefore, payment info 202 can be understood to be associated with a payment type 104, which can therefore be associated with a payment method 106, which can define the data elements used to process a payment.

Figure 3C:
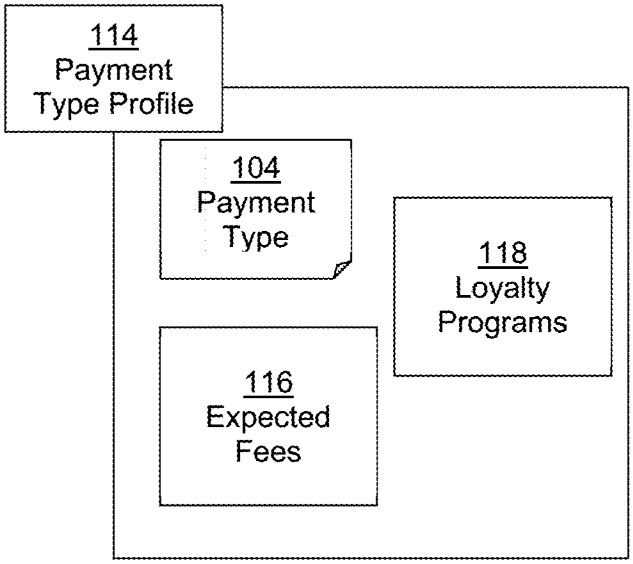
FIG. 3C is a schematic diagram depicting data elements of payment type profile, according to an embodiment.

FIG. 3C is a schematic diagram depicting data elements that can be stored in a payment type profile 114 by embodiments of the present disclosure. Each payment type profile 114 can be associated with a payment type 104 and can store publicly available or proprietary data related to payment type 104. Payment type profiles 112 can be stored in data store 500. Each payment type profile 114 can comprise a reference or link to the associated payment type 104. Expected fees 116 can comprise a data structure for storing a value (such as a percentage value), a range of values, or a formula for determining the fees that would be expected for transactions using the associated payment type 104. These fees can include interchange fees, transaction fees, subscription fees, and the like. In embodiments, various components and engines of system 100 can update expected fees based on information received, calculated, or inferred during various data transfers as discussed herein. Loyalty programs 118 can define one or more suppliers that are known to provide co-branding or loyalty deals or rewards to the customer. For example, an airline company may provide a MASTERCARD card to a customer that, when used for purchases of airline tickets, provides rewards to the customer. In embodiments, loyalty programs 118 can also define relationships between particular brokers and suppliers to capture agreements wherein a supplier can provide specific incentives to a broker for use of a particular payment type 104. While payment types 104 and payment type profiles 112 are depicted here as separate data structures, a single data structure comprising information related to each payment type 104 can be used by embodiments.

Referring again now to FIG. 2, broker interface 200 can be a user interface such as a graphical user interface or command-line interface, or an application programming interface (API), or combinations thereof in embodiments. Users of broker interface 200 can include broker users or customer users. Broker interface 200 can receive user inputs and provide user outputs regarding payment transactions processed by system 100. Broker interface 200 can comprise a mobile application, web-based application, any other executable application framework, or combinations thereof. Broker interface 200 can reside on, be presented on, or be accessed by, any computing devices capable of communicating with the various components of system 100, receiving user input, and presenting output to the user. In embodiments, broker interface 200 can reside or be presented on a smart phone, a tablet computer, laptop computer, or desktop computer. Broker interface 200 can be configured to receive payment information 202 and payment details requests 602 through one or more secured connections.

Figure 4A:
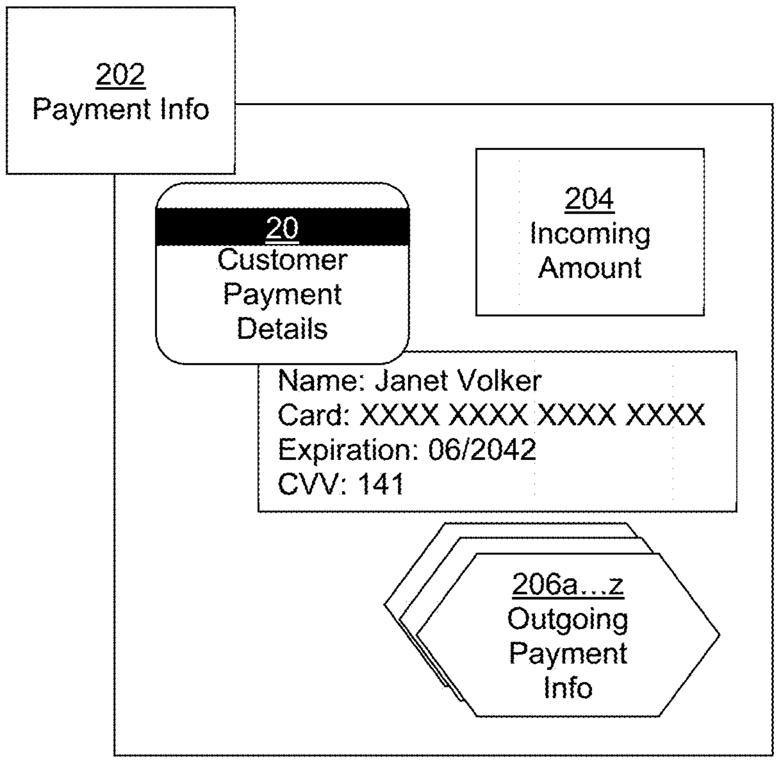
FIG. 4A is a schematic diagram depicting data elements of a payment information record, according to an embodiment.

FIG. 4A is a schematic diagram depicting data elements of payment information 202 according to an embodiment. Payment information 202 can comprise customer payment details 20, incoming amount 204, and one or more outgoing payment information 206 records. Customer payment details 20 can comprise the details necessary to process a payment for a customer. Incoming amount 204 is the total amount to be charged to the customer through customer payment details 20. In embodiments, payment information 202 can comprise multiple customer payment details 20 with associated incoming amounts 204, enabling a customer to split the transaction across multiple incoming payment methods.

Figure 4B:
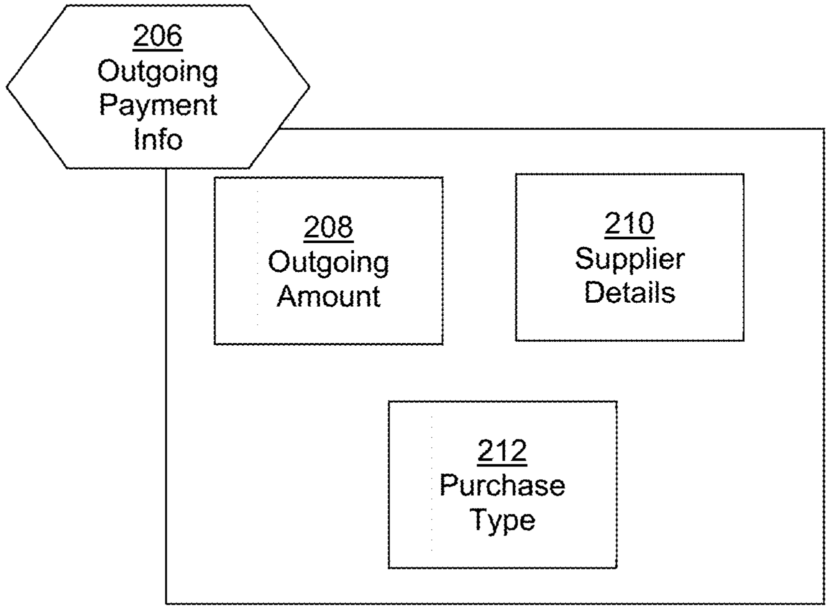
FIG. 4B is a schematic diagram depicting data elements of an outgoing payment information record, according to an embodiment.

FIG. 4B is a schematic diagram depicting data elements of an outgoing payment information 206 record according to an embodiment. Outgoing payment information 206 can comprise outgoing amount 208, supplier details 210, and purchase type 212. Supplier details 210 can comprise the supplier's name, locator, identifier, address, or any information necessary to provide payment of the outgoing amount 208 to the supplier. In embodiments, outgoing payment details can be provided to the broker exclusively via broker interface 200, such that supplier details 210 are not required. Purchase type 212 can describe a type or category of purchase to be made; these can include, for example, airline tickets, event tickets, hotels, rental cars, parking fees, and the like.

Figure 5:
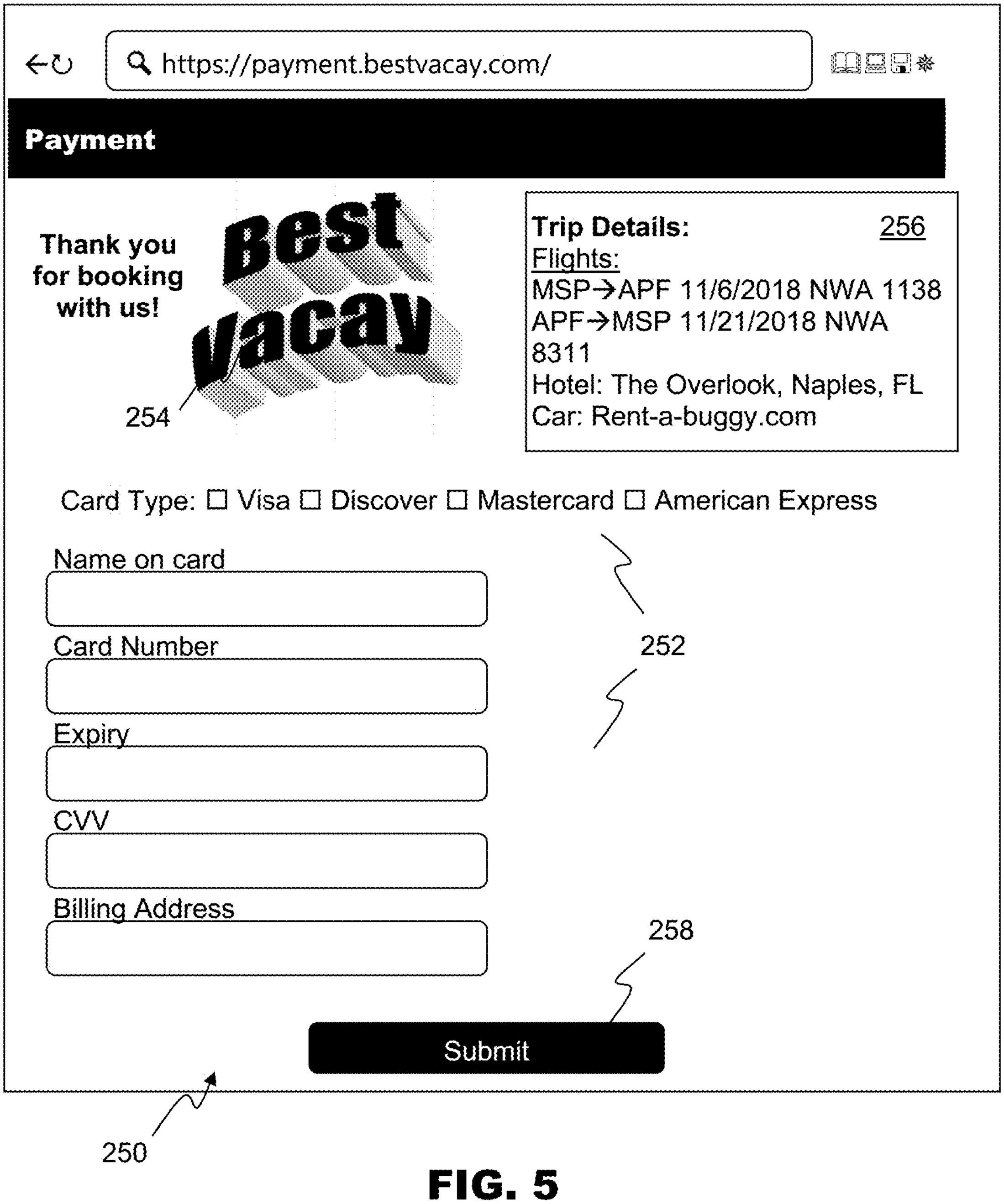
FIG. 5 is a layout depicting a graphical user interface screen, according to an embodiment.

Referring now to FIG. 5, in embodiments broker interface 200 can comprise customer payment portal 250. Customer payment portal 250 can comprise one or more user interface screens of a web page, web application, desktop application, or mobile application enabling a customer user to input incoming payment details 20 for payment card industry data security standard (PCI-DSS) compliant transfer to system 100. Input fields 252 can enable the customer user to provide the necessary payment details (such as card type, name on card, expiry date, and the like) to complete an order. Customer payment portal 250 can be integrated into a web site or web application associated with the broker, and can include broker-provided text or graphics, as depicted with logo 254. Customer payment portal 250 can further present a summary 256 listing the goods or services to be purchased on behalf of the customer for confirmation purposes. Incoming payment details 20 can be provided to transaction router 300 after the customer user completes the form, for example, by selecting the submit button 258. While FIG. 4 provides one example screen, other selections of input fields 252, layouts, or arrangements can be used.

Figure 6:
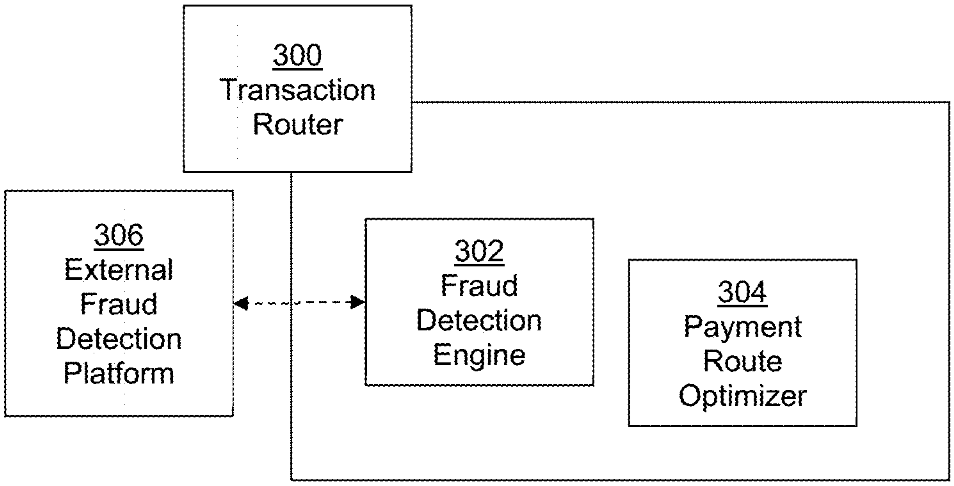
FIG. 6 is a schematic diagram depicting elements of a transaction router, according to an embodiment.

FIG. 6 is a schematic view depicting components of transaction router 300 according to an embodiment. Transaction router 300 can comprise fraud detection engine 302 and payment route optimizer 304. Transaction router 300 can be communicably coupled to broker interface 200 to receive payment information 202. Transaction router 300 can further be communicably coupled to a supplier payment system to provide pass-through customer payment details, and to payment gateway 400 for processing customer payment details. Transaction router 300 can further be coupled to data store 500 to receive historical transaction data.

Fraud detection engine 302, configured to determine whether payment information 202 includes data that is indicative of possible attempts at fraud. In embodiments, fraud detection engine can compare attributes of payment information 202 such as the incoming amount, supplier, purchase type, or identity of the customer, to one or more previously determined signatures of possible fraudulent transactions. In embodiments, fraud detection engine 302 can use machine-learning or deep-learning techniques to develop fraud signatures. These techniques can include: single-class support vector machines (SVMs), Keras models, Inception, Visual Geometry Group (VGG) 16-layer, VGG 19 layer, or Resnet networks, and the like. In embodiments, fraud detection engine 302 can be communicably coupled with one or more external fraud detection platforms 306. All or part of payment information 202 can be provided to the fraud detection platform 306 via an API or other programmatic interface for analysis. Examples of external fraud detection platforms that can be supported by embodiments include such as those provided by Vesta Corporation, Kount, Inc, or ClearSale, S.A. Based on the results of the internal and/or external analysis, payment information 202 can be routed to transaction router 300, or an error, warning, or other message can be transmitted to the customer user or broker user.

Transaction router 300 can further comprise a payment route optimizer 304 configured to determine whether to process customer payment details 20 through payment gateway 400 or pass-through to supplier 30 for each payment information record 202. In an embodiment, the payment route can be chosen based on a requested payment route specified in transaction preferences 350.

Figure 7:
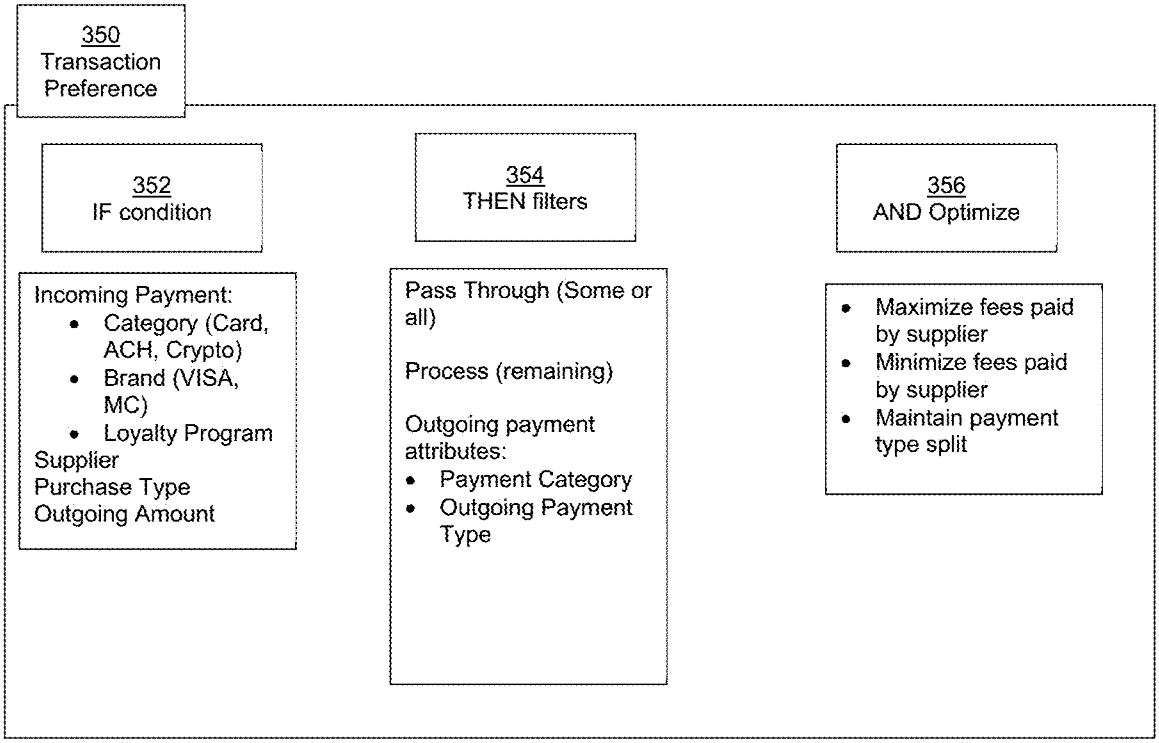
FIG. 7 is a schematic diagram depicting data elements of transaction preferences, according to an embodiment.

FIG. 7 is a schematic diagram depicting data elements of transaction preferences 350, according to an embodiment. Transaction preferences 350 can be stored in data store 500. In embodiments, transaction preferences 350 can be associated with specific broker users and/or be system-wide. In embodiments, transaction preferences 350 can comprise sets of conditions and rules for default transaction routing and payment detail generation decisions made by system 100. Transaction preferences 350 can be based on the identity of a supplier, the payment network brand, issuing organization of the incoming payment details, the type of good or service purchased, and the like.

Transaction preferences 350 can comprise one or more conditions 352, or "if" statements, that can be based on the payment type profile 114 of the customer payment details 20 and the outgoing payment information 206. In embodiments, conditions 352 can be defined based on the payment method 106, payment brand 108, issuing organization 110, or account number group 112 of the customer payment details 20. Conditions 352 can further be based on expected fees 114, or loyalty programs 118. Conditions 352 can further be based on the outgoing amount 208, supplier details 210, or purchase type 212. Conditions 352 can be defined as one or more logical statements, such as "if A and not B or D."

Transaction preferences 350 can further comprise one or more filters 354, or mandatory rules to be followed when conditions 352 apply. Transaction preferences 350 can define whether to pass through customer payment details 20 for all outgoing transactions, or a portion of outgoing transactions, as defined by outgoing payment information 206. Transaction router 300 can therefore use transaction preferences 350 to determine how to route customer payment details 20. For example, transaction preferences 350 can specify that "if the customer payment details are associated with a card that has the AMERICAN EXPRESS brand, then always pass customer payment details 20 through to the supplier."

Figure 10:
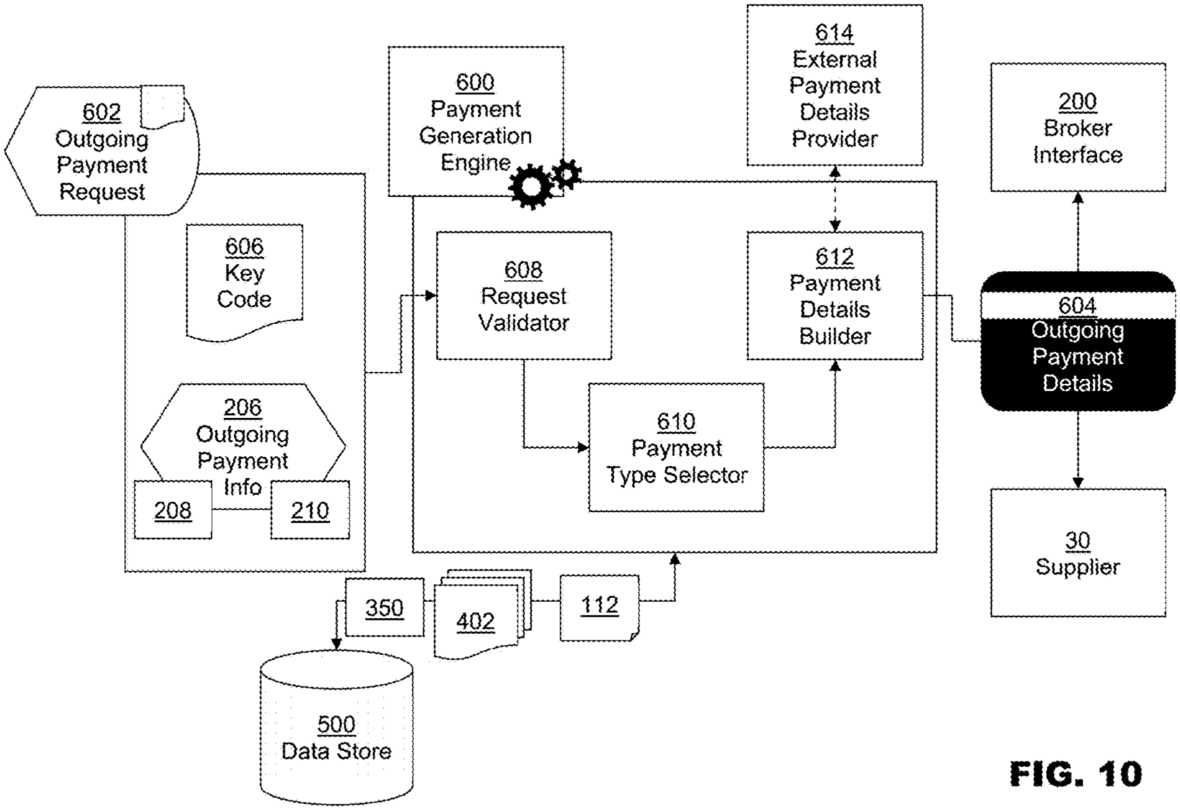
FIG. 10 is a schematic diagram depicting elements and data flows of a payment generation engine, according to an embodiment.

In addition to defining whether to pass-through or process customer payment details 20, filters 354 can narrow the set of available payment types to be generated as outgoing payment details 604 by payment generation engine 600, discussed with respect to FIG. 10 for transactions that are at least partially processed by system 100. Filters 354 can specify an outgoing payment method 106 (such as a card, ACH, or RTP payment), an outgoing payment brand 108, an outgoing payment issuing organization 110, or even a set of outgoing payment account number groups 112 or BINs to be generated.

Transaction preferences 350 can further comprise one or more optimization targets or goals 356 that can be applied when choosing between multiple payment types 104 that comply with filters 354. Example goals 356 can include: maximizing the fees paid by the supplier (which can therefore maximize the additional revenue received by broker); minimizing the fees paid by the supplier, and maintaining a percentage or currency amount split between different payment types, methods, or brands. For example, a broker user may have a preference to have 30% of the total value of outgoing transactions per day be from a first card brand, and 70% of the total value of outgoing transactions per day be from a second card brand. Goals 356 can also be associated with one or more priorities, such that the payment type 104 of outgoing payment details 604 can be chosen to optimize a first goal before a second goal, and vice versa.

Figure 8:
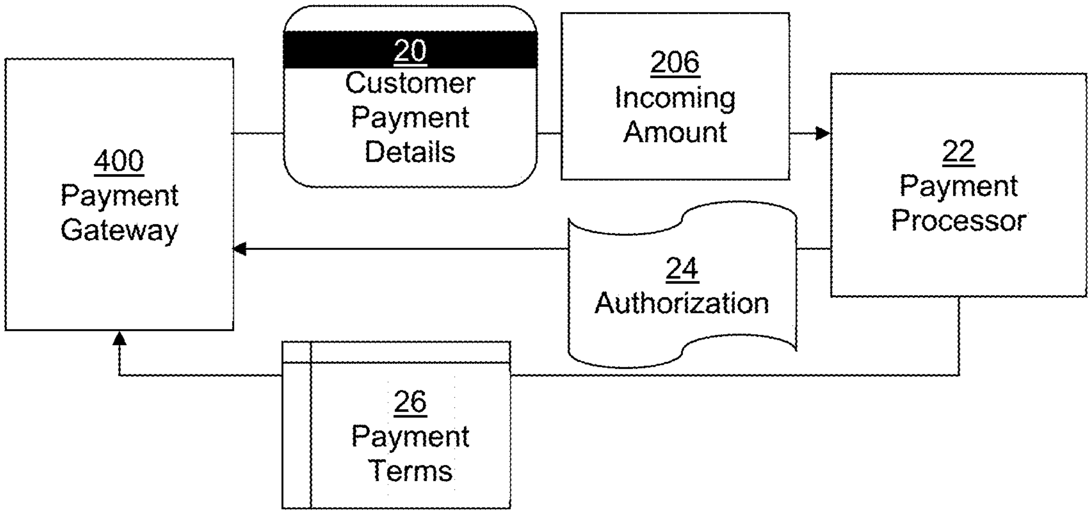
FIG. 8 is a schematic diagram depicting data flows of a merchant gateway, according to an embodiment.

Turning now to FIG. 8 a schematic diagram depicting data flows between payment gateway 400 and external payment processor 22 is provided. Payment gateway 400 can be communicably coupled to transaction router 300 to receive customer payment details 20 and incoming amount 206 and to payment processor 22 to process the payment. As depicted in FIG. 8, payment gateway 400 can provide customer payment details 20 and incoming amount 206 to request authorization 24 and payment terms 26 from payment processor 22. Payment terms 26 can be a data structure or packet including a variety of payment term values, including fees. Payment terms 26 can be received during the initial authorization, or asynchronously from the processing of the payment. For example, payment terms 26 can be received in one or more settlement statements received by payment processor on a daily, monthly, quarterly, or per-transaction basis. In embodiments, payment terms 26 can be stored in data store 500 and used to calculate expected payment terms for the payment type 104 associated with customer payment details 20.

Authorization 24 can comprise a token, string, or other data element indicating whether or not the payment based on the customer payment details 20 was successful. In embodiments, payment gateway 400 can comprise an interface to one or more third-party payment processing engines. After receiving a successful authorization, payment gateway 400 can generate a transaction tracking record 402 (discussed in more detail with reference to FIG. 9 below). Broker interface 200 can receive key code 404 or other elements of transaction tracking record 402 from payment gateway or transaction date store. Broker interface 200 can further provide key code 404 to the broker.

Figure 9:
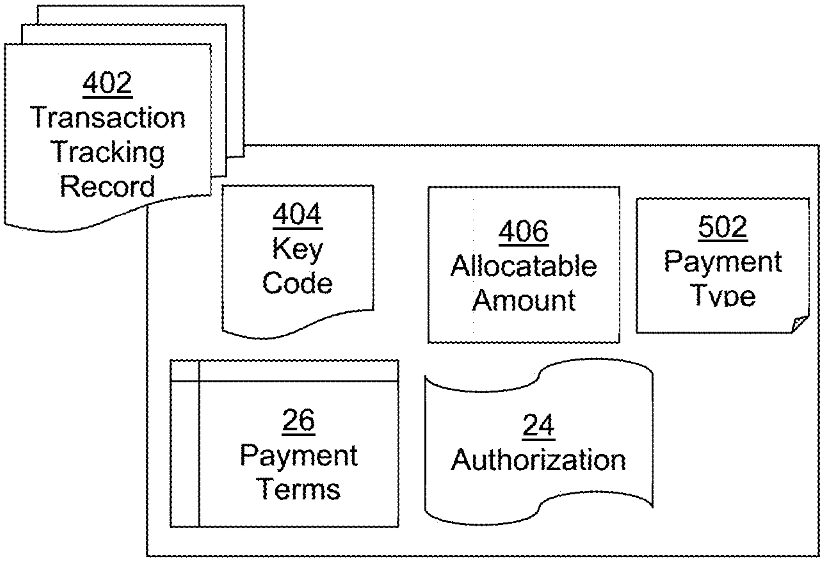
FIG. 9 is a schematic diagram depicting data elements of a transaction tracking record, according to an embodiment.

FIG. 9 is a schematic diagram depicting a data structure for a transaction tracking record 402 that can be stored in data store 500 according to an embodiment. Each transaction tracking record 402 can comprise a key code 404 that is uniquely generated for each transaction tracking record 402. Key code 404 can comprise a code, token, random or pseudorandom string, cryptographic hash, time stamp, or other identifier that is unique across transaction tracking records 402 and not easily guessable by brute force. For example, key code 404 can comprise a 256 bit SHA-1 hash generated based on authorization 24 and the current date and time. Transaction tracking record 402 can further comprise payment terms 26 and authorization 24 as received from payment processor 22. Allocatable amount 406 can be initially set to a value less than or equal to the incoming amount. Payment type 408 can comprise a reference to the payment type 104 customer payment details 20.

Data store 500 can comprise a database, file system, memory, or other storage system appropriate to store and provide the described data items. Data stores described herein can reside within a single database system or across a plurality of database systems. Database systems used in implementations can include Apache Hadoop, Hadoop Distributed File System (HDFS), Microsoft SQL Server, Oracle, Apache Cassandra, MySQL, MongoDB, MariaDB, or the like.

FIG. 10 is a schematic diagram depicting components and data flow of payment generation engine 600. Payment generation engine 600 can receive payment details requests 602 and generate one or more outgoing payments 604. Payment details request 602 can comprise an offered key code 606 and outgoing payment information 206, including outgoing amount 208, and supplier details 210, Outgoing payment details 604 can comprise a card or account number (including a BIN) associated with a credit, debit or charge card or virtual card, checking account, ACH details, or other account type. Outgoing payment details 604 can further comprise name, address, expiry, verification, or other details to enable a payment to be sent to supplier 30. Payment generation engine can comprise request validator 608, which can be communicably coupled to data store 500 to search or query for a transaction tracking record 402 with key code 404 that matches offered key code 606. Matching can be determined based on a key code 404 that is equivalent, or equal to offered key code 606, or matching can involve one or more symmetric or asymmetric cryptographic algorithms. For example, in embodiments, offered key code 606 can be a hash or key code 404, or a private key generated based on a public key and key code 404.

If the request is validated, payment type selector 610 can choose the payment type (or set of potential payment types) to be used to create or request the payment details based on transaction preferences 350. Payment details builder 612 can directly generate outgoing payment details 604, or request payment details by interfacing with one or more external payment details providers 614. Outgoing payment details 604 can be provided directly to supplier 30, or to the broker user via broker interface 200. Payment generation engine 600 can further update the associated transaction tracking record 402 to modify the allocated amount as necessary.

In embodiments, payment generation engine 600, or other components or engines of system 100 can track the settlement of each transaction made using outgoing payment details 604 to determine payment terms 26. Payment terms 26 can be used to update expected fees 116 or other data with payment type profile 114 associated with outgoing payment details 604. By updating payment type profile 114 based on received payment terms 26, system 100 can provide dynamically updated information to be used by transaction router 300 and payment generation engine 600.

Figure 11:
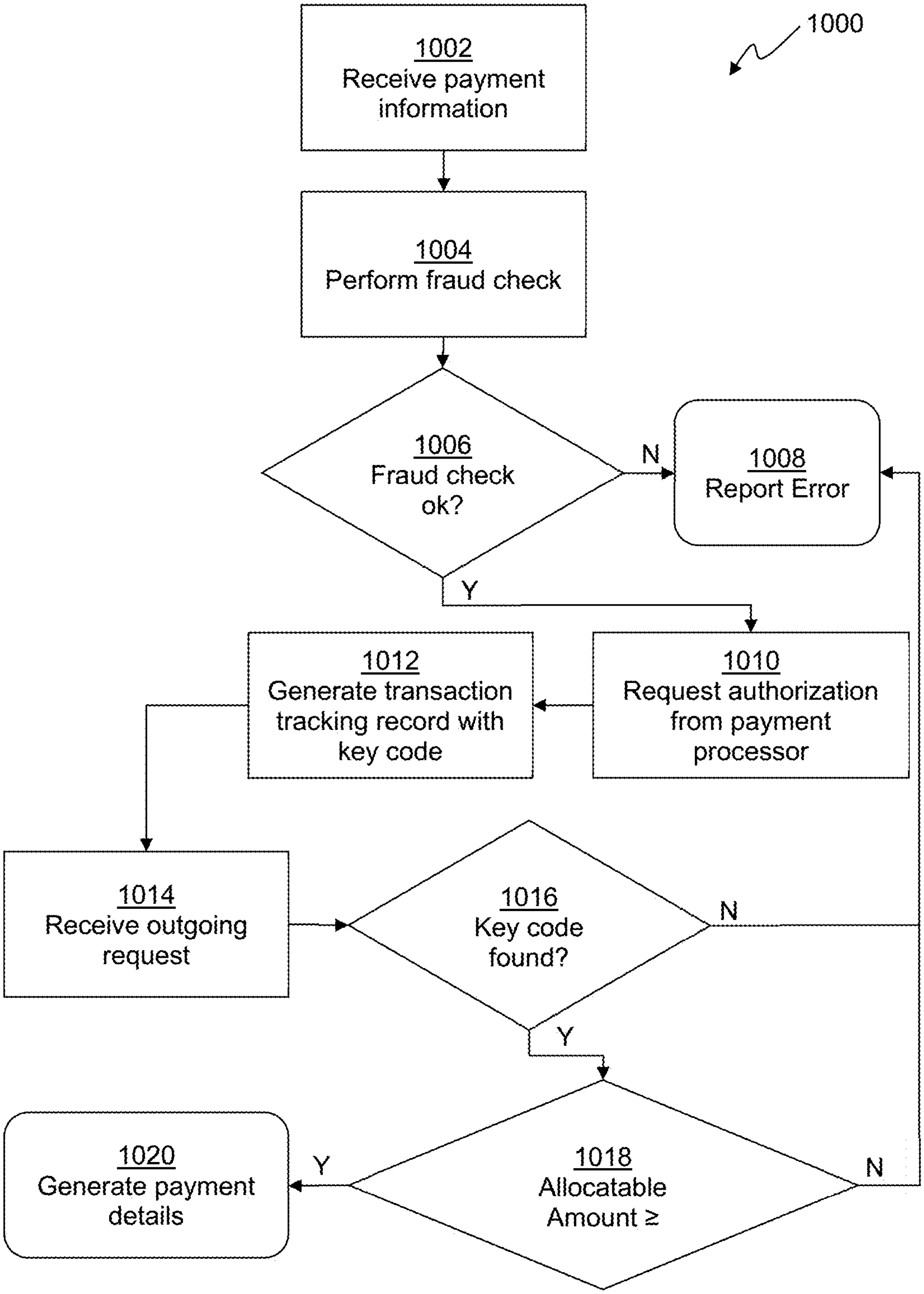
FIG. 11 is a flowchart depicting a payment generation method, according to an embodiment.

Embodiments of system 100 can perform or facilitate a variety of methods for receiving and providing payment details. FIG. 11 is a flowchart depicting a method 1000 for providing on-demand outgoing payment details to a broker based on (or underwritten by) incoming payment details received from a customer of the broker such that the broker can provide the outgoing payment details to a supplier to complete a transaction on behalf of the customer. At 1002, payment information 202 including customer payment details for payment of an incoming amount is received. Outgoing payment information 206 can be received at 1002, or at 1014 below, in embodiments. At 1004, a fraud check can be performed. If, at 1006, the results of the fraud check indicate a potential issue, an error condition can be reported at 1008. Error conditions can be reported to a customer user, broker user, or administrator through broker interface 200. Otherwise, processing can continue with requesting authorization and payment terms from the customer payment network at 1010. After authorization is received, at 1012, a transaction tracking record and key code can be generated and stored in data store 500. The key code can be provided to the broker interface 200.

At 1014, a payment details request 602 can be received, including an offered key code 606 and outgoing payment information 206 (if not previously received at 1002). At 1016, the data store 500 can be searched for a transaction tracking record 402 with a matching key code. If one is not found, an error can be reported at 1008. If a transaction tracking record 402 with matching key code 404 is found, the amount requested can be validated at 1018. If the outgoing amount of the payment details request is less than the allocatable amount, outgoing payment details can be generated and the allocatable amount can be reduced by the outgoing amount at 1020.

Figure 12:
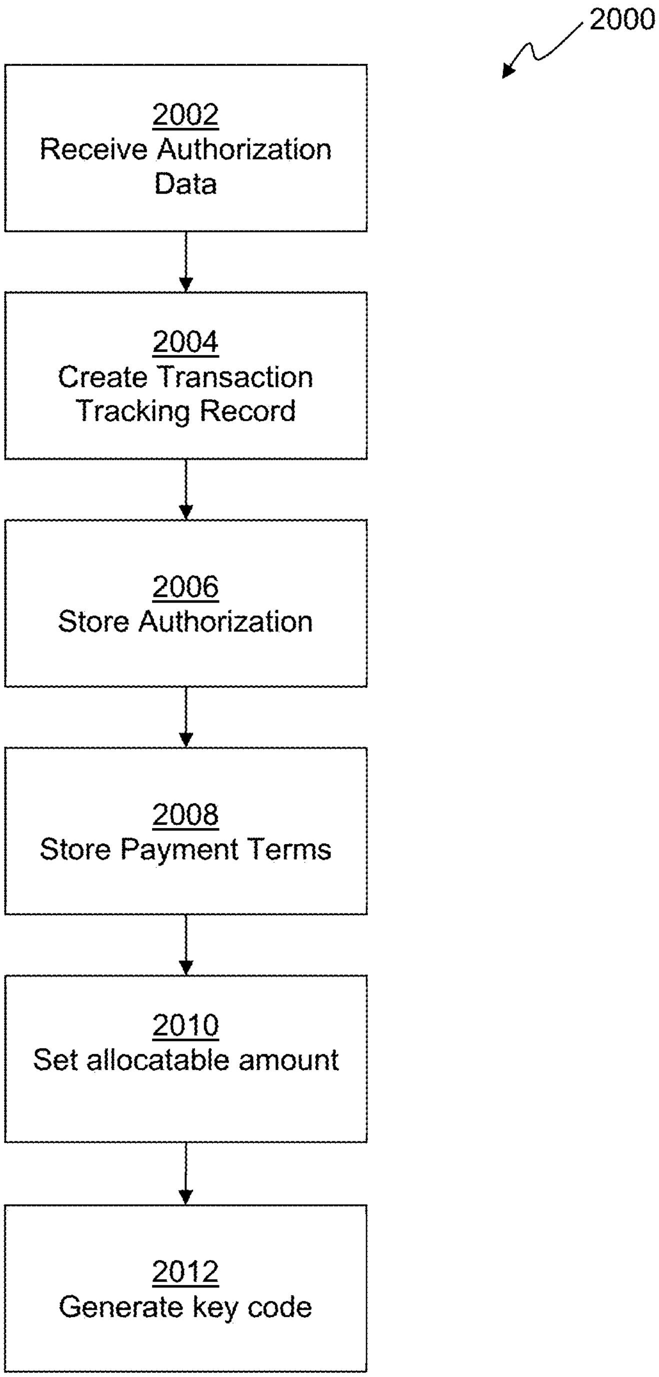
FIG. 12 is a flowchart depicting a payment processing method, according to an embodiment.

FIG. 12 is a flowchart depicting a method 2000 for creating a transaction tracking record, according to an embodiment. In embodiments, method 2000 can be performed, executed, or facilitated by payment gateway 400. At 2002, authorization data and payment terms can be received. At 2004, a transaction tracking record 402 can be created for storage in data store 500. In embodiments, transaction tracking record 402 can be initially created within data store 500, or transaction tracking record 402 can be initially stored within the memory of payment gateway 400 and communicated to data store 500 when transaction tracking record 402 is complete.

At 2006, the authorization data 24 received from the payment processor 22 can be stored. At 2008, the payment terms 26 received from the payment processor 22 can be stored. At 2010, the allocatable amount 406 can be initialized to a value that is equal to the incoming amount.

At 2012, a key code 404 can be generated and stored within the transaction tracking record 402. In embodiments, key code 404 can include, or be generated based on authorization 24, incoming amount 204, allocatable amount 406, or other data within transaction tracking record 402. Key code 404 can also include, or be generated based on, a time and date of the authorization 24. Key code 404 can further include an estimated outgoing transaction count.

Figure 13:
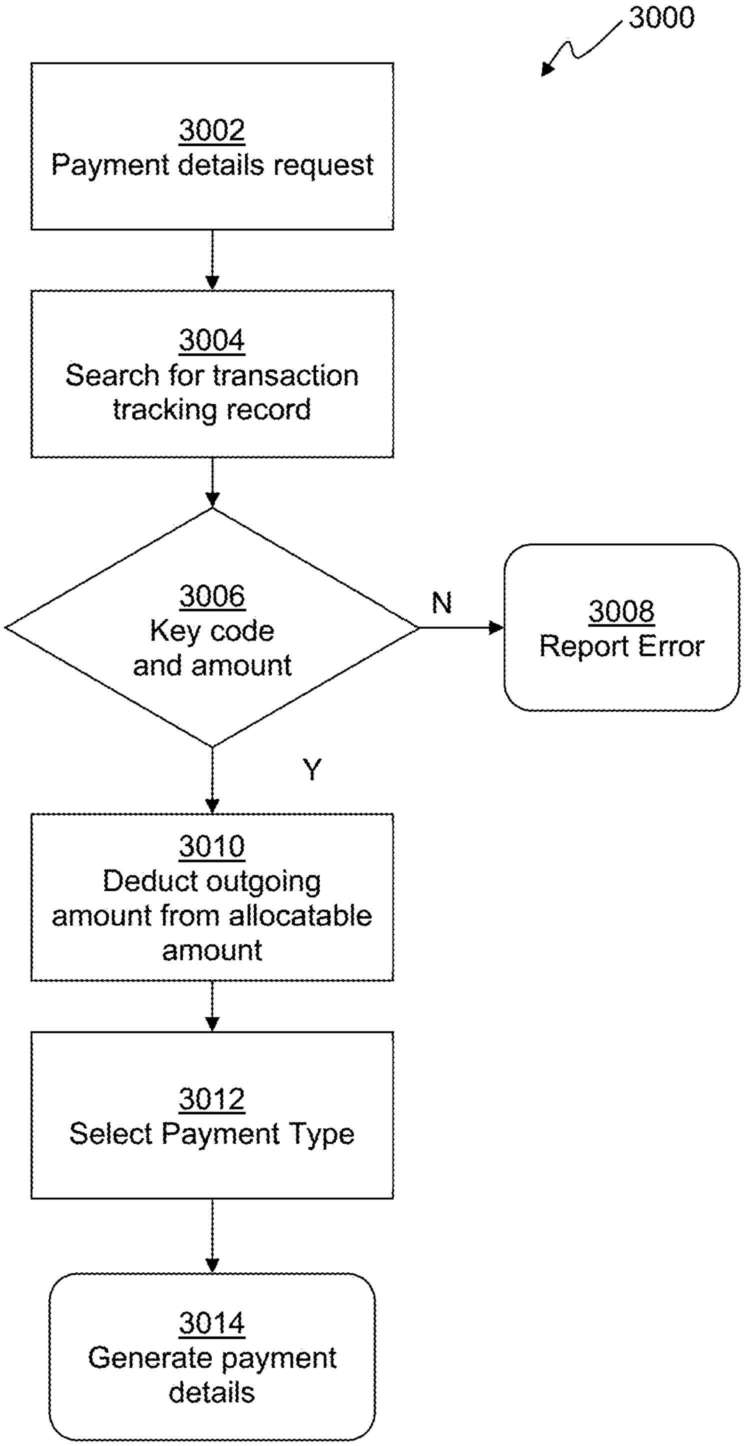
FIG. 13 is a flowchart depicting a payment generation method, according to an embodiment.

FIG. 13 is a flowchart depicting a method 3000 for generating outgoing payment details 604. In embodiments, method 3000 can be performed, executed, or facilitated by payment generation engine 600. At 3002, a payment details request can be received. At 3004, data store 500 can be searched or queried to find a transaction tracking record with key code 404 that matches offered key code 606. At 3006, if a matching transaction record 402 is not found or a matching transaction record 402 is found with an allocatable amount 406 less than the outgoing amount 208, an error can be reported at 3008. In embodiments, the number of previously generated outgoing payment details 604 associated with the matched transaction record 402 can be checked to ensure that it is below a previously determined minimum value.

At 3010, the outgoing amount 208 can be deducted from the allocatable amount 406 and the transaction tracking record 402 can be updated in data store 500. At 3012, a payment type can be selected, as described below with respect to FIG. 14. At 3014, the outgoing payment details 604 can be generated, and provided to the broker user via broker interface 200, or directly to the supplier 30.

Figure 14:
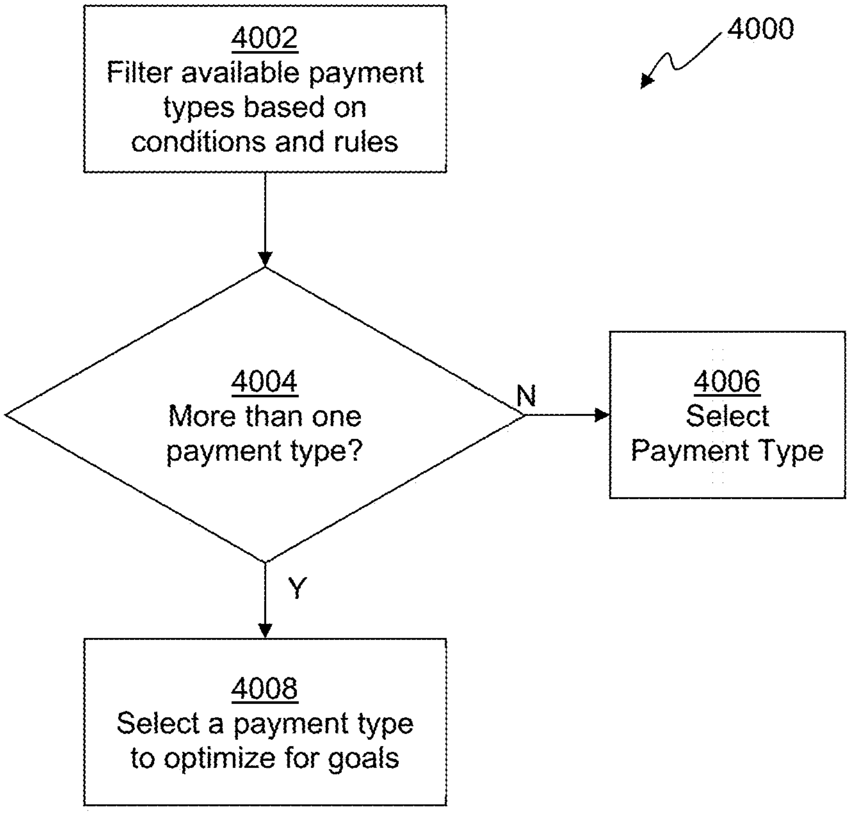
FIG. 14 is a flowchart depicting a payment type selection method, according to an embodiment.
Figure 15:
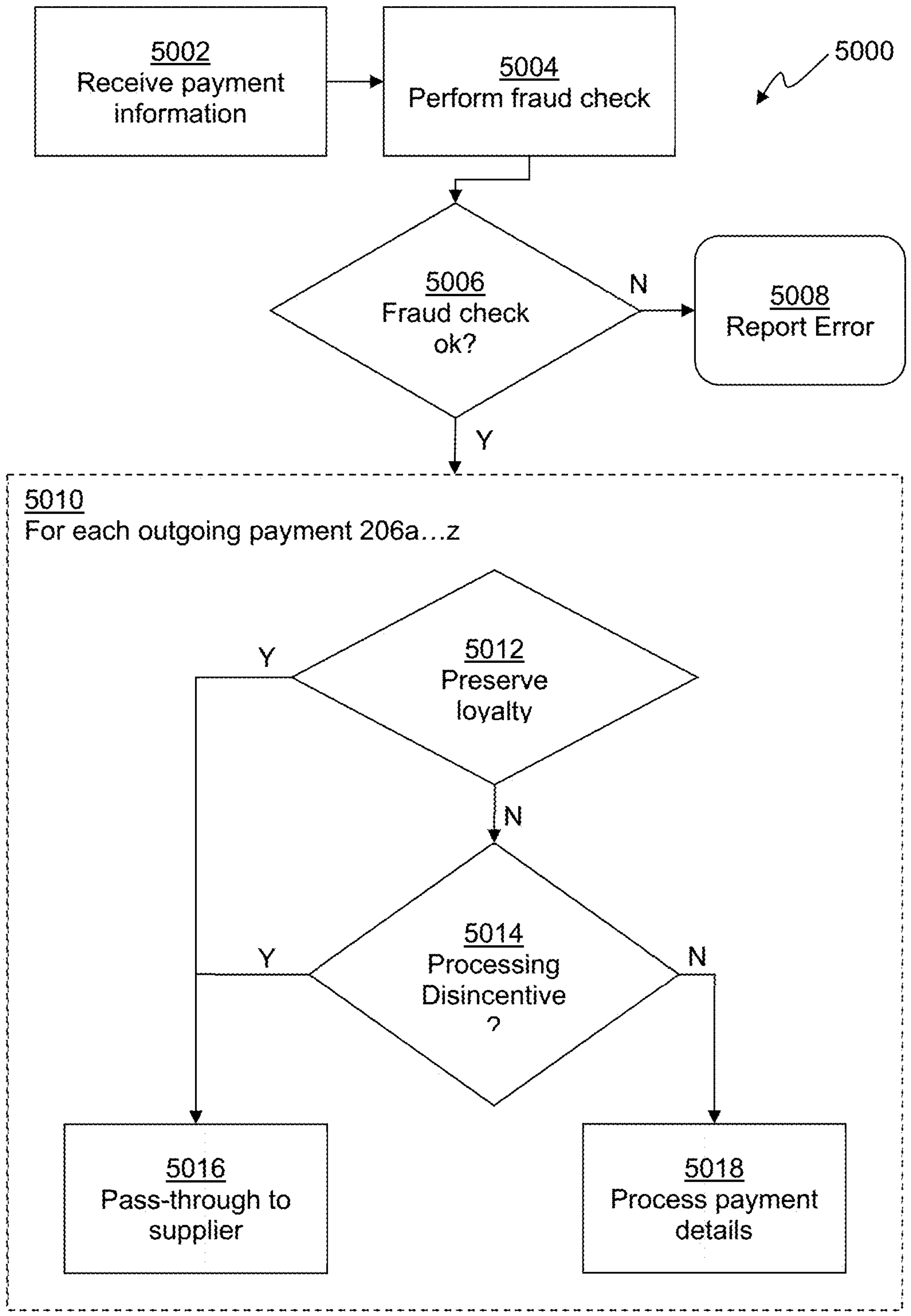
FIG. 15 is a flowchart depicting a transaction routing method, according to an embodiment.

FIG. 14 is a flowchart depicting a method 4000 for selecting a BIN for an outgoing payment details, according to embodiments. Method 4000 can be executed or facilitated by payment type selector 610. At 4002, a universe or set of possible payment types can be chosen based on conditions 352 and filters 354 of transaction preferences 350. In embodiments, the set of possible payment types can be ranked or ordered based on how well each payment type matches the conditions 352 and filters 354. At 4004, if the set of possible payment types contains only one payment type, that payment type can be selected at 4006. At 4008, the set of possible payment types can be further filtered or sorted based on optimization goals 356. Various optimization algorithms known in the art can be used to sort optimization goals 356 based on one or more fitness criteria such as linear and non-linear programming, dynamic programming, genetic algorithms, and the like.

FIG. 14 is a flowchart depicting a method 5000 for determining whether incoming customer payment details should be processed, for example by payment gateway 400, or passed directly to supplier 30. At 5002, payment information 202 including customer payment details 20, incoming amount 204, and outgoing payment information 206 can be received. At 5004, a fraud check can be performed. If, at 5006, the results of the fraud check indicate a potential issue, an error condition can be reported at 5008. Error conditions can be reported to a customer user, broker user, or administrator through broker interface 200. If no potential issues are found, processing can continue at 5010 for the entire transaction, or for each outgoing payment (outgoing payment 206*a*, 206*b*, etc.).

At 5012, a decision can be made to preserve a co-branding, or loyalty program, benefit. For example, customer payment details 20 may be a reward card, such that if a transaction involves the purchase of one or more specified products or services from one or more specified suppliers, the customer user may receive an additional benefit. This can be determined by checking the loyalty programs 118 associated with customer payment details 20. In embodiments, transaction preferences 350 can include a field indicating whether or not to preserver co-branding benefits. If a co-branding benefit exists and is to be preserved, the customer payment details 20 can be passed through to supplier 30 at 5016.

If not, at 5014, transaction preference 350 can be used to determine if other reasons exist to pass through customer payment details 20. For example, there may be a maximum number or value of transactions that can be processed for a given payment method 106 or brand 108. Further, the expected fees 114 payable for processing customer payment details 20 may be higher than a certain threshold. Generally, the actual fees associated with customer payment details 20 will not be known until the processing of the customer payment details 20 has begun. By dynamically updating expected fees 116 based on received payment terms 26, system 100 can use historic fees to predict likely fee amounts, enabling better decision making.

At 5018, the payment can be processed, for example through method 2000, as described above. In embodiments, the processing of the payment at 5018 can be delayed until decisions have been made for all outgoing payment information (206*a*, 206*b*, etc.) records for payment information 202. This can reduce the number of processing transactions made using customer payment details 20. Importantly, each payment can be generated automatically by payment generation engine 600 without the need for further user intervention at processing time.

Embodiments of the present disclosure present a number of advantages over conventional payment methods and systems. Embodiments substantially reduce risk and other pain points for certain types of merchants by providing a system for management, coordination, settlement, and securing of both incoming and outgoing payment transactions.

Embodiments provide a technological platform that can enable the use of a combined account for both accepting payments and issuing payments. The combined account can be established and managed through contract. This can simplify the administration and technological integration work and reduce costs for broker users. Conventional systems lack the technology to enable links between customer payments and funding virtual cards or other forms of outgoing payment methods. The technological improvements of the disclosed embodiments provide the ability to make payments based solely on the authorization of a customer payment. This is clearly advantageous as clients are often not able to obtain the credit funds that they need to run and grow their business at the pace they would like.

Embodiments comprise risk controls that can help ensure that a broker user pays for everything that the customer purchased. For instance, on a per broker user basis, the present method can ensure that all outgoing transactions must total at least some threshold (for example 90%) of the incoming transaction amount. This can be varied by broker user based on each broker user's average margins.

Embodiments further comprise integrated fraud controls. Whereas conventional system included fraud solutions integrated with the ability to accept credit cards, the present disclosure provides fraud solutions integrated with the ability to ability to issue cards.

Embodiments of the present disclosure enable virtual cards or other payment details or credentials to be issued on-demand and in real-time. Conventional methods provide credit through a delayed process (hours or days), involving multiple organizations, all of which can be avoided through embodiments. This can be especially helpful when a broker is booking services such as airline tickets, which cannot be "reserved" like hotel rooms. Embodiments further comprise a cash settlement process and technology wherein incoming transactions are settled on the same day (or before) as all outgoing transactions.

Embodiments provide a one-to-one match of the incoming transaction from the customer and the outgoing payments to supplier(s). Embodiments can capture the payment details information and provide it to broker users through GUI or API interfaces. Embodiments enable real-time reconciliation reports of incoming payments from brokers and the outgoing payments to suppliers. This unique functionality enables the customer to easily monitor their sales and ensure all transactions are appropriately handled.

Embodiments of the present disclosure enable automatic payment of the broker user's margin to the broker user daily. Each day, the broker user can receive a report detailing the difference between all their incoming payments (from customers) and their outgoing payments (to suppliers). The net difference can be provided to an account of the broker-user's choosing through, for example, direct ACH deposit.

It should be understood that the individual steps used in the methods of the present teachings may be performed in any order and/or simultaneously, as long as the teaching remains operable. Furthermore, it should be understood that the apparatus and methods of the present teachings can include any number, or all, of the described embodiments, as long as the teaching remains operable.

In one embodiment, the system 100 and/or its components or subsystems can include computing devices, microprocessors, modules and other computer or computing devices, which can be any programmable device that accepts digital data as input, is configured to process the input according to instructions or algorithms, and provides results as outputs. In one embodiment, computing and other such devices discussed herein can be, comprise, contain, or be coupled to a central processing unit (CPU) configured to carry out the instructions of a computer program. Computing and other such devices discussed herein are therefore configured to perform basic arithmetical, logical, and input/output operations.

Computing and other devices discussed herein can include memory. Memory can comprise volatile or non-volatile memory as required by the coupled computing device or processor to not only provide space to execute the instructions or algorithms, but to provide the space to store the instructions themselves. In one embodiment, volatile memory can include random access memory (RAM), dynamic random access memory (DRAM), or static random access memory (SRAM), for example. In one embodiment, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the disclosure.

In one embodiment, the system or components thereof can comprise or include various modules or engines, each of which is constructed, programmed, configured, or otherwise adapted to autonomously carry out a function or set of functions. The term "engine" as used herein is defined as a real-world device, module, component, or arrangement of components implemented using hardware, such as by an application specific integrated circuit (ASIC) or field-10 programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that embodiments may comprise fewer features than illustrated in any individual embodiment described above. The embodiments described herein are not meant to be an exhaustive presentation of the ways in which the various features may be combined. Accordingly, the embodiments are not mutually exclusive combinations of features; rather, embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Moreover, reference in the specification to "one embodiment," "an embodiment," or "some embodiments" means that a particular feature, structure, or characteristic, described in connection with the embodiment, is included in at least one embodiment of the teaching. The appearances of the phrase "in one embodiment" in various places in the specification are not necessarily all referring to the same embodiment.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of Section 112, sixth paragraph of 35 U.S.C. are not to be invoked unless the specific terms "means for" or "step for" are recited in a claim.

The invention claimed is:

1. A system for providing on-demand outgoing payment details, the system comprising:
- a memory storing computer-readable instructions that when executed by a processor cause the processor to implement:
- a network-connected interface to receive customer payment details, associated with a first payment type, for payment of an incoming amount, wherein the incoming amount includes a combination amount of one or more purchase types;
- a data store configured to store:
  - a plurality of transaction tracking records, each transaction tracking record comprising a unique key code and an allocatable amount;
  - a plurality of transaction preferences including use of specific broker users, identity of the supplier, payment network brand, type of good or service and mandatory optimization rules that can maintain a payment split between different payment types, methods or brands; and
  - a plurality of payment type profiles, each payment type profile associating a payment type with one or more payment attributes;
- a transaction router including a payment route optimizer for determining whether to process customer payment details through a supplier pass-through or through a payment gateway based on transaction preferences, said transaction preferences comprising one or more filter selections;
- wherein the filter selections dynamically updates expected fees based on historic fees to predict likely fee amounts for each payment type;
- the payment gateway, communicably coupled to a payment processor and configured to:
  - receive authorization data for payment of the incoming amount from the payment processor,
  - store a transaction tracking record in the data store upon receipt of the authorization data, the allocatable amount of the transaction tracking record being initialized to a value less than or equal to the incoming amount,
  - initializing the unique key code with a cryptographic hash value, said cryptographic hash generated based on the authorization data and a current date and time;
- an outgoing payment generator configured to:

receive at least one outgoing payment request, associated with the one or more purchase types, comprising an offered key code and an outgoing amount;

for each outgoing payment request having an offered key code matching a unique key code of an existing transaction tracking record in the data store, generate outgoing payment details, associated with at least a second payment type, wherein the second payment type is associated with one of a second brand, organization, or group alternative to the first payment type for purchase of an outgoing first purchase type and a third payment type, wherein the third payment type is associated with one of a third brand, organization, or group alternative to the first and second payment types for outgoing purchase of a second purchase type; and reduce the allocatable amount of the existing transaction tracking record by the outgoing amount if the outgoing amount is less than or equal to the allocatable amount, wherein the at least second and third payment types, selected between multiple payment types, is selected by a filter defined by a plurality of transaction preferences comprising one or more optimization goals associated with the one of the brands, organizations, or groups in compliance with the filter, wherein the filter selection maintains an outgoing percentage or currency amount distributed between the multiple payment types within a predetermined period of time.

2. A method for providing on-demand outgoing payment details by a network-connected computing system, the method comprising:

receiving, at network-connected interface, customer payment details, associated with a first payment type, for payment of an incoming amount;

running a fraud check on the customer payment details wherein an error message is sent upon a fraud detection;

requesting authorization data for payment of the incoming amount from a payment processor, storing a transaction tracking record in a data store upon receipt of the authorization data, the transaction tracking record comprising a unique key code and an allocatable amount, the allocatable amount being initialized to a value less than or equal to the incoming amount, and initializing the unique key code with a cryptographic hash value calculated based on the authorization data and a current date and time;

storing a plurality of payment type profiles in the data store, each payment type profile associating a payment type with one or more payment attribute; and in response to receiving an outgoing payment request, associated with one or more purchase types, comprising an offered key code and an outgoing amount:

verifying that the offered key code matches the unique key code of an existing transaction record in the data store and that the outgoing amount is less than or equal to the allocatable amount of the existing transaction record, a transaction router including a payment route optimizer for determining whether to process customer payment details through a supplier pass-through or through a payment gateway based on transaction preferences;

applying transaction preferences to the outgoing payment request, said transaction preferences comprising one or more filters or mandatory rules including use of specific broker users, identity of the supplier, payment network brand, type of good or service and mandatory optimization rules that can maintain a payment split between different payment types, methods or brands;

generating outgoing payment details for each purchase type, associated with at least a second payment type, alternative to the first payment type, wherein the second payment type is associated with one of a second brand, organization, or group for purchase of an outgoing first purchase type and a third payment type, wherein the third payment type is associated with one of a third brand, organization, or group alternative to the first and second payment types for outgoing purchase of a second purchase type;

and reducing the allocatable amount of the existing transaction record by the outgoing amount, wherein the at least second and third payment types, selected between multiple payment types, is automatically selected by a filter defined by a plurality of transaction preferences comprising one or more optimization goals in compliance with the filter, said filter selections dynamically updates expected fees based on historic fees to predict likely fee amounts for each payment type, wherein each outgoing payment request is automatically processed and an outgoing payment generated for each outgoing payment without need for further user intervention.

* * * * *